(12) United States Patent
VanKirk

(10) Patent No.: US 9,857,837 B1
(45) Date of Patent: Jan. 2, 2018

(54) PORTABLE ELECTRONIC DEVICE CASE

(71) Applicant: Nathan VanKirk, Sherwood, OH (US)

(72) Inventor: Nathan VanKirk, Sherwood, OH (US)

( * ) Notice: Subject to any disclaimer, the term of this patent is extended or adjusted under 35 U.S.C. 154(b) by 0 days.

(21) Appl. No.: 15/411,331

(22) Filed: Jan. 20, 2017

(51) Int. Cl.
| | |
|---|---|
| *H04B 1/3883* | (2015.01) |
| *H04B 1/3888* | (2015.01) |
| *G06F 1/16* | (2006.01) |
| *H04M 1/02* | (2006.01) |
| *A45C 11/00* | (2006.01) |
| *A45C 13/00* | (2006.01) |
| *B65D 81/107* | (2006.01) |
| *F21L 4/08* | (2006.01) |

(52) U.S. Cl.
CPC ............ *G06F 1/1628* (2013.01); *A45C 11/00* (2013.01); *A45C 13/001* (2013.01); *A45C 13/005* (2013.01); *B65D 81/107* (2013.01); *F21L 4/08* (2013.01); *G06F 1/1635* (2013.01); *G06F 1/1656* (2013.01); *G06F 1/1681* (2013.01); *H04B 1/3888* (2013.01); *H04M 1/0202* (2013.01); *A45C 2011/001* (2013.01); *A45C 2011/002* (2013.01); *A45C 2011/003* (2013.01)

(58) Field of Classification Search
CPC ....................................................... H04B 5/00
See application file for complete search history.

(56) References Cited

U.S. PATENT DOCUMENTS

| | | | |
|---|---|---|---|
| 6,317,313 B1 | 11/2001 | Mosgrove et al. | |
| D561,092 S | 2/2008 | Kim | |
| 7,723,947 B2 * | 5/2010 | Stenroos | H02J 7/0044 320/101 |
| 7,889,498 B2 | 2/2011 | Diebel et al. | |
| 8,046,039 B2 * | 10/2011 | Lee | G06F 1/1626 455/575.8 |
| 8,604,753 B2 * | 12/2013 | Bessa | H02J 7/0044 320/101 |
| 9,118,195 B2 * | 8/2015 | Foster | H02J 7/0044 |
| 9,130,332 B2 * | 9/2015 | Yosef | H01R 31/06 |
| 9,461,493 B2 * | 10/2016 | Fathollahi | H02J 7/0045 |
| 9,520,912 B1 * | 12/2016 | Chen | H04B 1/3888 |
| 9,559,548 B2 * | 1/2017 | Kwon | H02J 7/025 |
| 9,647,474 B2 * | 5/2017 | Fathollahi | H02J 7/0044 |
| 9,698,623 B2 * | 7/2017 | Adams | H02J 7/355 |
| 9,706,026 B2 * | 7/2017 | Carnevali | G06F 1/1628 |
| 9,723,390 B2 * | 8/2017 | Shaffer | H04R 1/1025 |
| 2003/0096642 A1 | 5/2003 | Bessa et al. | |

(Continued)

*Primary Examiner* — Cindy Trandai
(74) *Attorney, Agent, or Firm* — Global Intellectual Property Agency, LLC; Jordan Sworen

(57) ABSTRACT

A portable electronic device case. The portable electronic device case includes a first panel and a second panel that are hingedly connected. A recessed area on the first panel is configured to receive an electronic device and retain it therein. An interchangeable mounting dock is removably attachable to the first panel and includes an electronic device connector configured to receive electronic devices and establish an electrical connection therewith. A charger and a battery on the first panel are each in electrical communication with the mounting dock, such that either may charge an electronic device mounted onto the mounting dock. A locking mechanism enables the first and second panel to fasten to one another. The second panel is configured to fold over and onto the first panel such that it encloses an electronic device stored within the recessed area of the first panel.

17 Claims, 5 Drawing Sheets

(56) References Cited

U.S. PATENT DOCUMENTS

| | | | | |
|---|---|---|---|---|
| 2008/0007214 | A1* | 1/2008 | Cheng | H02J 7/0044 320/114 |
| 2009/0314400 | A1* | 12/2009 | Liu | A45C 11/00 150/165 |
| 2010/0022277 | A1* | 1/2010 | An | H04M 1/72527 455/566 |
| 2012/0306431 | A1 | 12/2012 | Li et al. | |
| 2014/0253024 | A1* | 9/2014 | Rautiainen | H02J 7/025 320/108 |
| 2015/0207360 | A1* | 7/2015 | Adams | H02J 7/35 320/101 |
| 2015/0288204 | A1* | 10/2015 | Weinstein | H02J 7/0044 320/107 |
| 2015/0351271 | A1* | 12/2015 | Dawson | B65D 51/28 220/521 |
| 2016/0036267 | A1* | 2/2016 | Yang | H02J 7/0044 320/101 |
| 2016/0294427 | A1* | 10/2016 | Wojcik | H04B 1/3883 |
| 2017/0133870 | A1* | 5/2017 | Miller | H02J 7/0044 |

* cited by examiner

PORTABLE ELECTRONIC DEVICE CASE

BACKGROUND OF THE INVENTION

The present invention relates to a case for portable electronic devices. More specifically, it relates to a portable electronic device case having a charger, a battery, and an interchangeable charging dock configured to accommodate different types of electronic devices.

Individuals utilize many different types of portable electronic devices, such as personal digital assistants (PDAs), computers, smart phones, mobile phones, music players, MPS players, medial players, digital cameras, video cameras, and global positioning systems (GPS). Typically these devices are battery powered, so that people can carry and use the devices throughout their daily lives.

These portable electronic devices allow people to play and record music, send and receive e-mail, send text messages, browse the Internet, make phone calls, play and record video, take and view pictures, edit documents, and much more. These devices continue to revolutionize the way people interact, learn and connect with other people, conduct business, and find things. They help people manage their daily lives and sometimes are an entertainment source.

Because portable electronic devices are somewhat fragile and used to carry valuable personal information, such as contact information including phone numbers and addresses, financial information, private photos and videos, and favorite music tracks, many people protect their portable electronic devices using cases. Depending on the particular case design, these cases protect the back, sides, and front of the devices from scratches, dings, drops, and other physical damage. Some cases may even have pockets to hold extra batteries or memory so that when a battery becomes discharged, the person can take the used battery and replace it with a fresh battery from the case's pocket. Then the used battery can be recharged using a recharger at home.

Also, as modern portable electronic devices evolve, they continue to provide more features and greater functionality. For example, screen sizes become larger and have greater resolution. The devices have greater wireless range or capabilities and more sensors. Applications that run on these devices also may use more processing power. All these improvements and changes usually are an additional drain on the battery, shortening how long these devices can be used on a single charge.

Therefore, there is a need for a portable case that in addition to protecting these devices from damage and the elements, also includes a charger and battery capable of charging a phone stored in the case and is configured to receive a variety of different electronic devices.

SUMMARY OF THE INVENTION

In view of the foregoing disadvantages inherent in the known types of electronic device cases now present in the prior art, the present invention provides a portable electronic device case wherein the same can be utilized for providing convenience for the user when utilizing an electronic device while traveling. The present invention comprises a first panel including a frame defining a recessed area having an interior volume sized to receive and retain an electronic device therein, the frame including an upper wall, a lower wall, a left side wall, a right side wall, and upper open end for providing access to the recessed area. An opening disposed on the lower wall extends through a lower end of the first panel. An interchangeable mounting dock is removably securable to the lower end of the first panel via the opening. The interchangeable mounting dock is configured to receive the charging port of an electronic device. A charger disposed on the first panel is in electrical communication with the electronic device connector. A battery disposed on the rear of the first panel is in electrical communication with the electronic device connector. A second panel hingedly connected to the first panel is configured to fold over and onto the first panel, thereby concealing the recessed area of the first panel. A light disposed on the second panel is operably coupled to the charger and the battery. The light is configured to indicate when the charger or the battery is charging an electronic device mounted onto the mounting dock.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
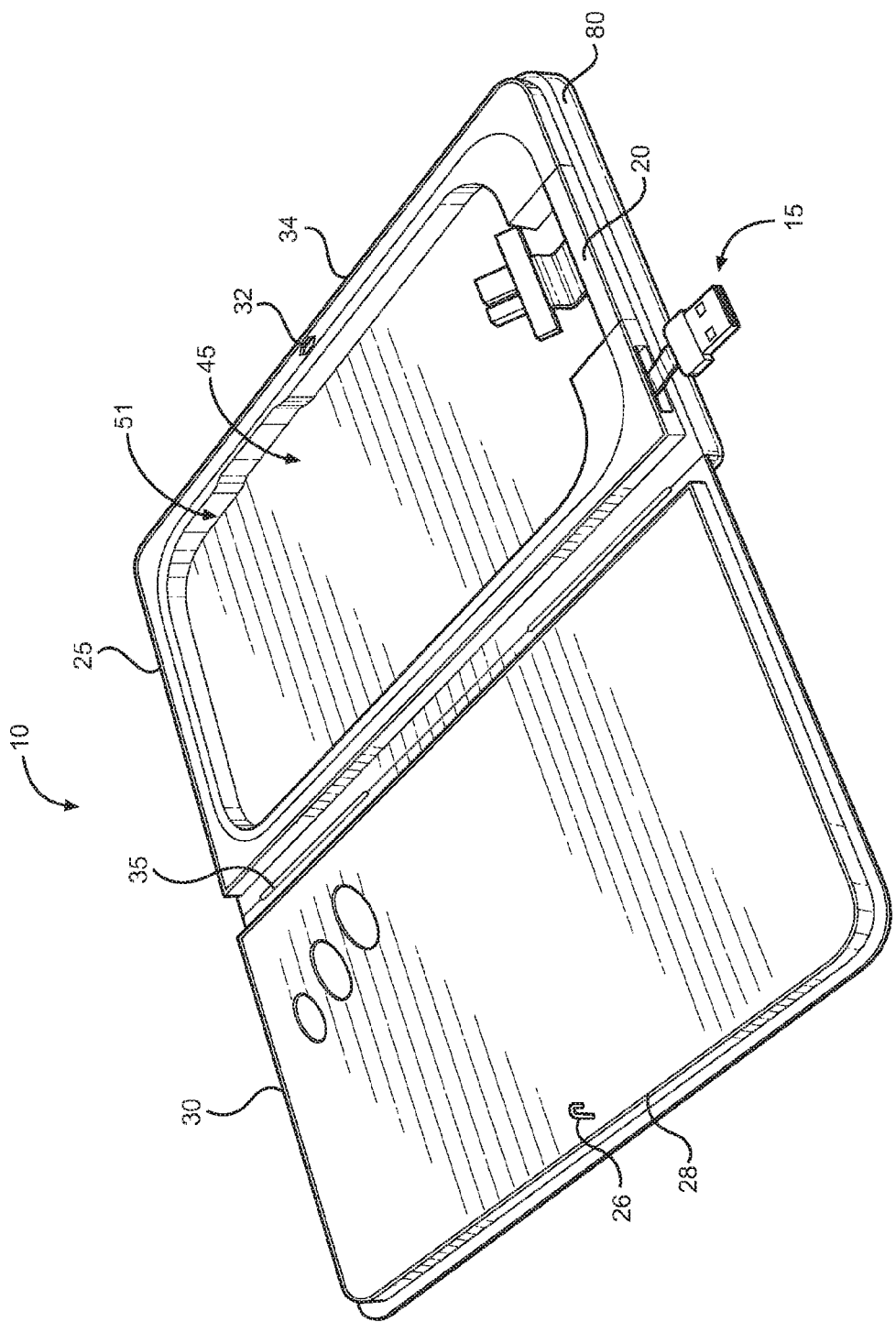
FIG. 1 shows a perspective view of the portable electronic device case.

Reference is made herein to the attached drawings. Like reference numerals are used throughout the drawings to depict like or similar elements of the portable electronic device case. The figures are intended for representative purposes only and should not be considered to be limiting in any respect.

Referring now to FIG. 1, there is shown a perspective view of the portable electronic device case. The present invention comprises a portable electronic device case 10 having a charger 15 and a battery 80, each in electrical communication with one or more interchangeable mounting docks 20. The one or more mounting docks 20 are configured to receive different electronic device charging ports, such that the mounting docks 20 may establish an electrical connection in between the electronic device, the charger 15, and the battery 80. The portable electronic case 10 includes a first panel 25 and a second panel 30 that are hingedly connected to one another. The first and second panels 25, 30 include rectangular planar members that are hingedly connected via a hinge 35. In the depicted embodiment, the first and second panels 25, 30 the hinge includes a metal hinge. In alternative embodiments, the first and second panels 25, 30 are hingedly connected via a living hinge. The first panel 25 includes a recessed area 45 configured to receive an electronic device and retain it therein. The second panel 30 is configured to fold over and onto the first panel 25 in a stacked configuration via the hinge and fasten thereto such that the second panel 30 covers the top of the electronic device stored within the first panel 25. In this way, the case 10 completely surrounds the electronic device, thereby protecting the electronic device within the case 10. The first and second panels 25, 30 include the same size and shape as one another such that when they are fastened, they are aligned and coterminous, or occupy the same boundary.

The first and second panels 25, 30 include a locking mechanism for removably attaching to one another and providing access to the recessed area 45. In the depicted embodiment, the locking mechanism includes a latch 26 disposed on a side perimeter edge 28 of the second panel 30 and an aperture 32 disposed on a side perimeter edge 34 of the first panel 25. In the depicted embodiment, the latch 28 and aperture 32 are positioned on a center of their respective side perimeter edges 28, 24. The latch 28 is aligned with the aperture 32 and configured to lock into the aperture 32 such that the second panel 30 may be fastened to the first panel 25. In the depicted embodiment, the latch 28 comprises a hook configured to fasten into the aperture by grasping an interior of the aperture 32. In alternative embodiments, the locking mechanism includes magnets disposed on the first and second panels 25, 30 that are configured to magnetically engage so as to fasten the first and second panels 25, 30 to one another.

Figure 2:
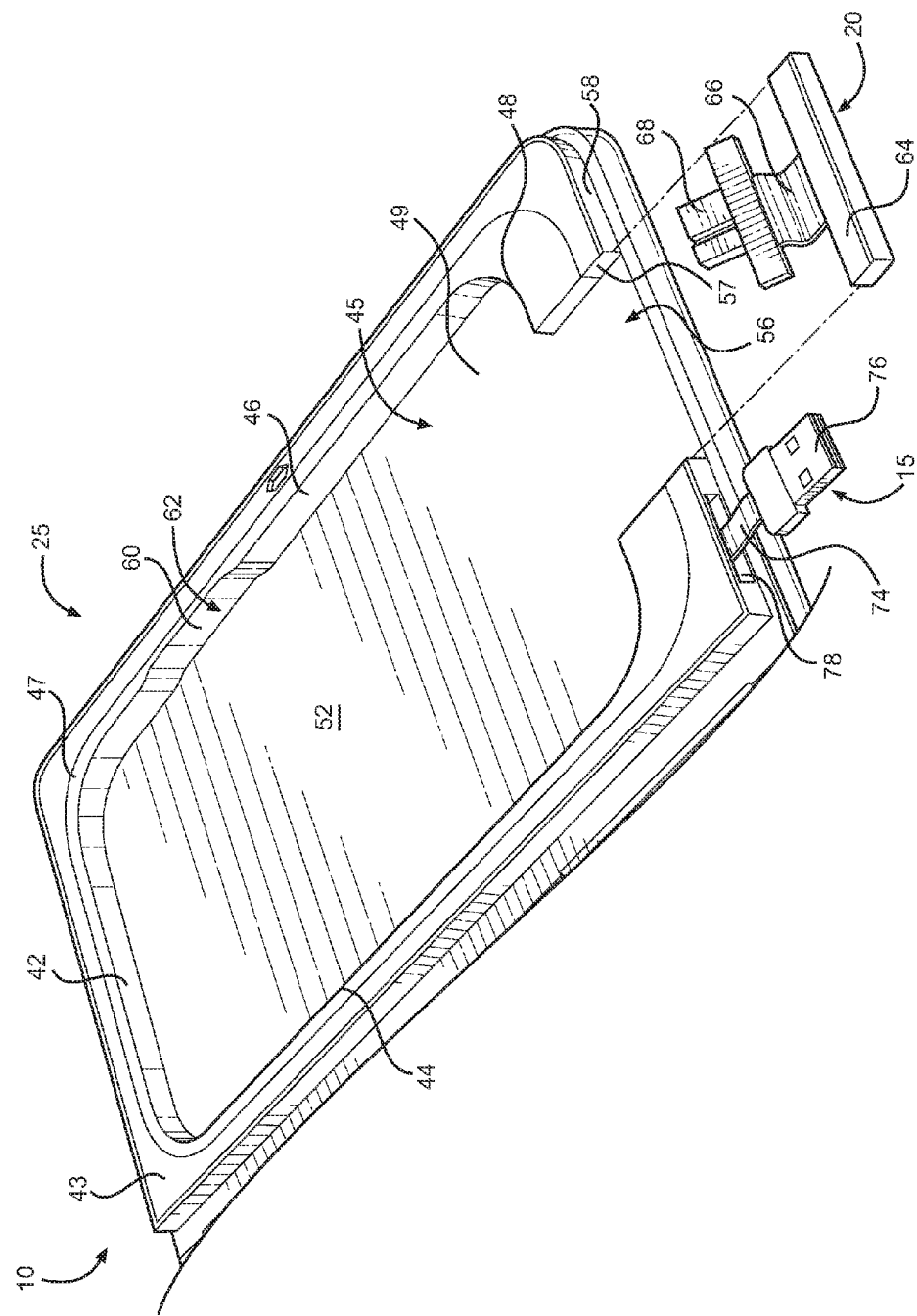
FIG. 2 shows a close-up view of the first panel of the portable electronic device case.

Referring now to FIG. 2, there is shown a close-up view of the first panel of the portable electronic device case. In the depicted embodiment, the first panel 25 comprises a rectangular-shaped planar member including the recessed area 45 disposed on a center thereof, the charger 15, and an opening 56 configured to receive the one or more interchangeable mounting docks 20. The recessed area 45 is sized to receive an electronic device flush and compactly therein, such that the upper surface of the electronic device is even with an upper surface 43 of the panel 25. In one embodiment, the recessed area 45 is sized to receive an iPhone. In another embodiment, the recessed area 45 is sized to receive a Samsung smart phone. In an alternative embodiment, the recessed area 45 is size to receive a Google smart phone.

The recessed area 45 includes an interior volume sized to receive an electronic device therein and frame 47 defining an upper wall 42, a left sidewall 44, a right sidewall 46, a bottom wall 48, and an open upper end 51 for providing access into the recessed area 45. In one embodiment, the frame 47 is constructed of a rigid material, such as rubberized plastic or silicone, so as to further protect an electronic device inserted in the case 10. The upper wall 42 comprises corners that are integrally attached to upper ends of the right and left sidewalls 44, 46 that are sized to receive the upper corners of an electronic device. The right sidewall 46 comprises a concave cut-out portion 60 that forms a gap 62 in between an electronic device and the right sidewall 46 when the electronic device is inserted into the recessed area 45. The cut-out portion 60 is concave relative to the recessed area 45. In this way, the gap 62 provides a space in which a user may insert a portion of his or her finger to grasp the side of the electronic device and remove it from the recessed area 45. The bottom wall 48 also includes corners that are integrally attached to bottom ends of the left and right sidewalls 44, 46 that are configured to receive the lower corners of an electronic device. The recessed area 45 further includes a base 49 including a padded surface 52 for absorbing shock. The base 49 extends from a lower end of each wall. In one embodiment, the padded surface includes a gel-like substance. The opening 56 is disposed at a center of a bottom end 58 of the first panel 25 and extends from the bottom end 58 through the bottom wall 48 of the recessed area 45, thereby forming an opening in the bottom wall 48.

The one or more mounting docks 20 are removably securable to the opening 56 of the first panel 25. The one or more mounting docks 20 each include a mounting member 64, a flexible member 66, and an electronic device connector 68 for connecting to a charging port of an electronic device. The electronic device connector 68 is affixed to the flexible member 66, which in turn is affixed to the mounting member 64. The mounting member 64 is configured to friction fit the sidewalls 57 of the opening 56 such that the mounting member remains secured to the first panel 25. When the one or more mounting docks 20 are secured to the first panel 25, the electronic device connector 68 protrudes radially inwardly into the recessed area 45. The flexible member 66 is constructed of a flexible material capable of flexing such that the electronic device connector 68 can pivot upwards and downwards relative to the first panel 25. In this way, a user may pivot the electronic device connector 68 upwards to receive the charging port of an electronic device before the electronic device is inserted into the recessed area 45. In one embodiment, the mounting docks 20 comprise an electronic device connector 68 having an iPhone/iPad/iPod connector. In another embodiment, the mounting docks 20 comprise an electronic device connector having a micro universal serial bus (USB) connector.

The charger 15 comprises an extendable cable 74 having an electrical connector 76 affixed to an end thereof. The charger 15 is extendable from an aperture 78 disposed on the bottom end 58 of the first panel 25, such that a user may extend the cable 74 to connect the electrical connector 76 to a charging port. The cable 74 is stowable into the aperture 78 as desired, such that a user can store the charger 15 inside the case 10. The aperture 78 is sized to receive the electrical connector 76 flush therein, such that when the charger 15 is stowed, the electrical connector is completely within the aperture 82. In the depicted embodiment, the electrical connector 76 comprises a USB connector. However, in other embodiments, the electrical connector 76 may comprise other types of electrical connectors, such as micro USB connectors.

Figure 3:
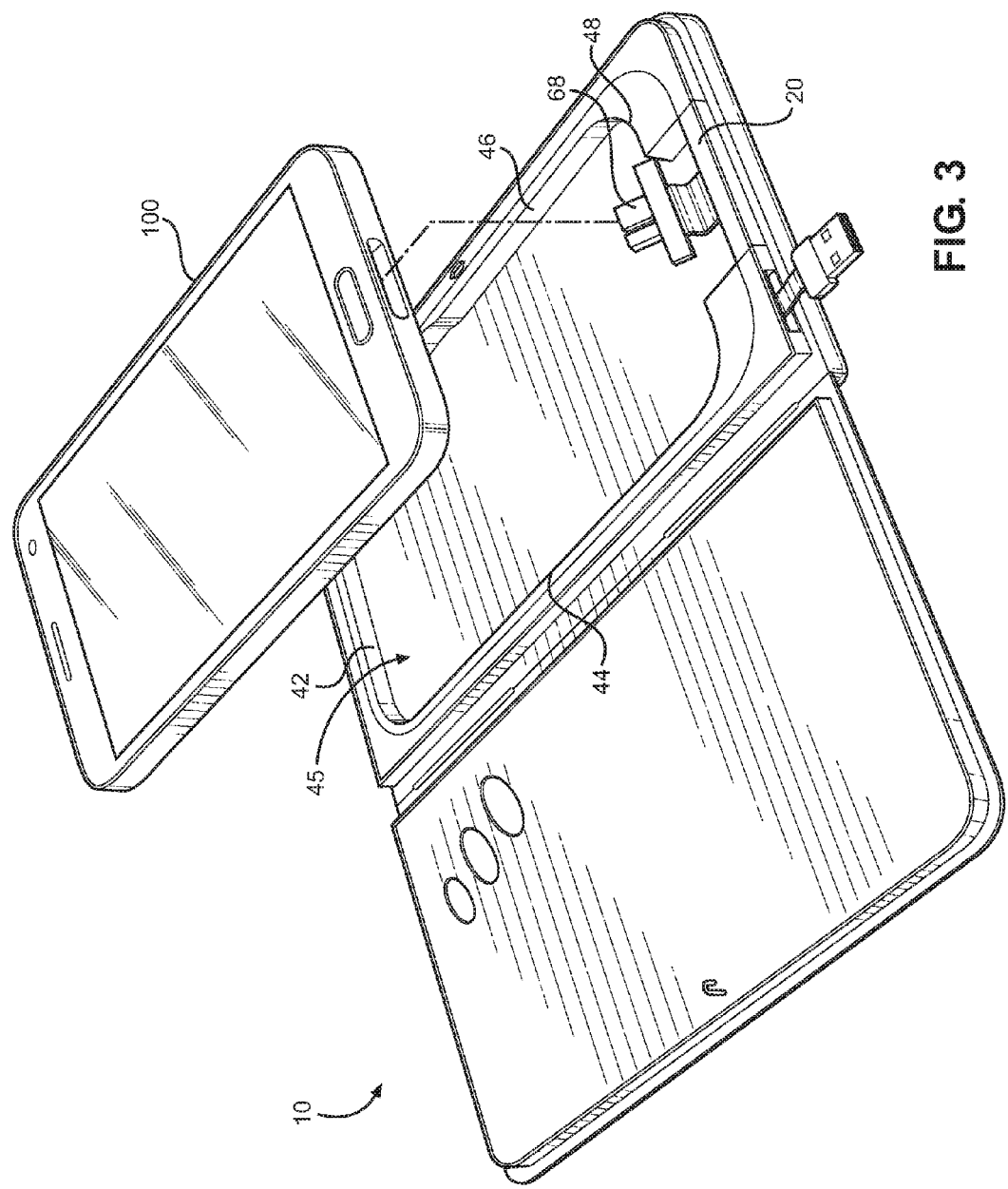
FIG. 3 shows an exploded view of an electronic device positioned for insertion into the recessed area of the portable electronic device case.

Referring now to FIG. 3, there is shown an exploded view of an electronic device positioned for insertion into the portable electronic device case. In operation, before an electronic device is inserted into the portable electronic device case 10, a user first connects the electronic device 100 to the mounting dock 20 via the electrical device connector 68. Once connected to the mounting dock 20, a user then inserts or mounts the electronic device 100 into the recessed area 45. Once inserted into the recessed area 45, the walls 42, 44, 46, 48 friction fit the sides of the electronic device 100 to hold it compactly within the recessed area 45.

Figure 4:
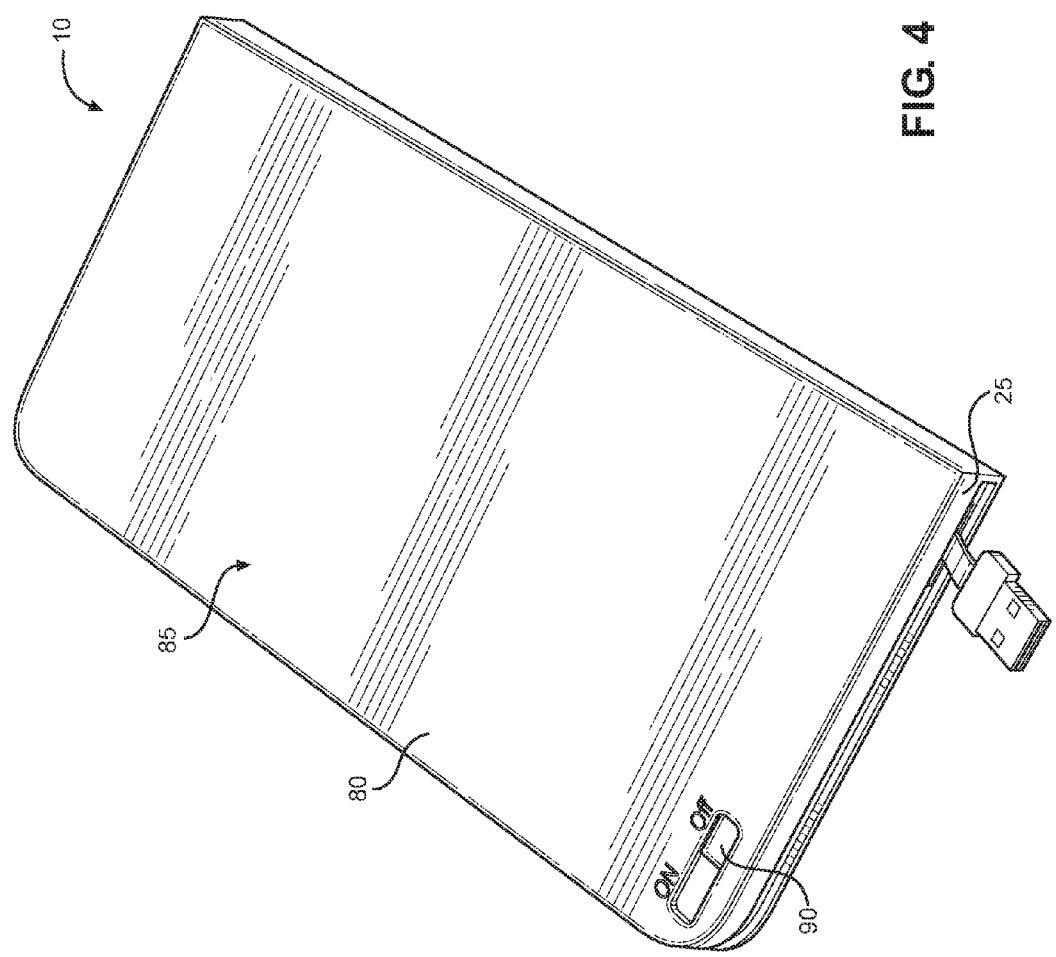
FIG. 4 shows a perspective rear view of the first panel of the portable electronic device case.

Referring now to FIG. 4, there is shown a perspective rear view of the portable electronic device case. The portable electronic device case 10 further includes a battery 80 operably coupled to the one or more mounting docks for charging an electronic device mounted onto the electronic device connector of the mounting docks. In the depicted embodiment, the battery 80 is positioned on the rear 85 of the first panel 25 and includes a power switch 90 for powering the battery 80 on and off as desired. In this way, the portable electronic device case 10 enables a user to charge his or her phone while traveling or away from a charging port or power source, thereby prolonging the life of the electronic device while mounted therein.

Figure 5:
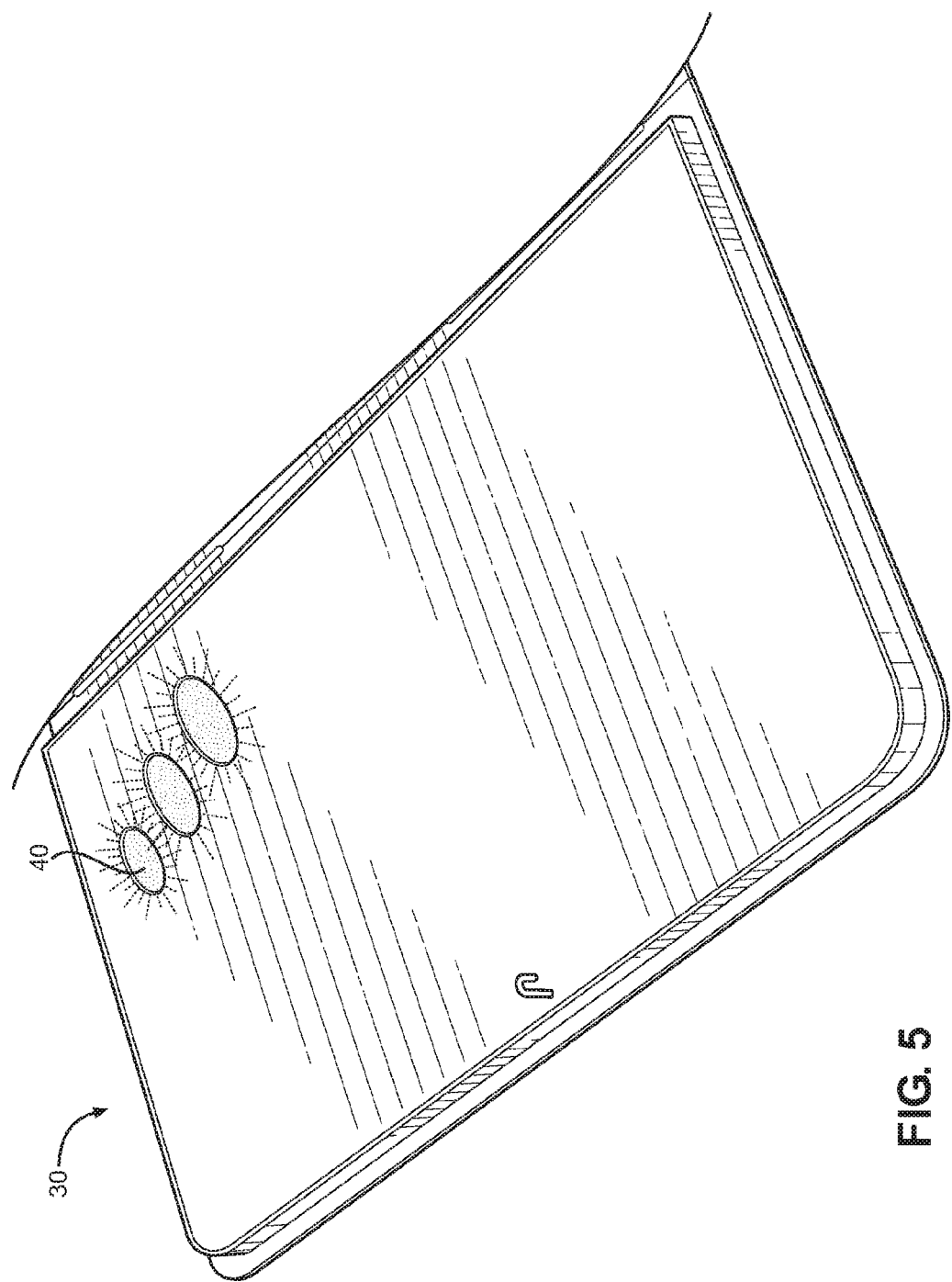
FIG. 5 shows a close-up view of the second panel of the portable electronic device case.

Referring now to FIG. 5, there is shown a close-up view of the second panel of the portable electronic device case. In the depicted embodiment, the second panel 30 comprises a rectangular planar member including one or more lights 40 operably coupled to the charger and the battery for indicating the charging status of an electronic device being charged therein. In the depicted embodiment, the lights 40 include a plurality of flashing lights configured to power on when an electronic device is stored in the recessed area and mounted onto the electronic device connector and either the charger is connected to a power source or the battery is powered on.

It is therefore submitted that the instant invention has been shown and described in various embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A portable electronic device case, comprising:
   a first panel including a frame defining a recessed area having an interior volume sized to receive and retain an electronic device therein, the frame including an upper wall, a lower wall, a left side wall, and a right side wall;
   an opening disposed on the lower wall and extending through a lower end of the first panel;
   an interchangeable mounting dock removably securable to the lower end of the first panel via the opening, the interchangeable mounting dock configured to receive the charging port of an electronic device;
   a charger disposed on the first panel, the charger in electrical communication with the electronic device connector;
   a battery disposed on a rear of the first panel, the battery in electrical communication with the electronic device connector;
   a second panel hingedly connected to the first panel, the second panel configured to fold over and onto the first panel, thereby concealing the recessed area; and
   a light disposed on the second panel, the light operably coupled to the charger and the battery, wherein the light is configured to indicate when the charger or the battery is charging an electronic device mounted onto the mounting dock.

2. The portable electronic device case of claim 1, wherein the recessed area includes a padded base for absorbing shock.

3. The portable electronic device case of claim 1, wherein the interior volume of the recessed area is sized to receive an electronic device such that an upper surface of the electronic device is flush with an upper surface of the first panel.

4. The portable electronic device case of claim 1, wherein the frame includes a concave cut-out portion that is concave relative to the recessed area, the concave cut-out portion forming a gap between the frame and an electronic device mounted therein.

5. The portable electronic device case of claim 1, wherein the frame is composed of a rigid material.

6. The portable electronic device case of claim 1, wherein the interchangeable mounting dock includes a mounting member, a flexible member, and an electronic device connector configured to receive the charging port of an electronic device.

7. The portable electronic device case of claim 6, wherein the mounting member is sized to securely fit within an opening of the lower wall via a friction fit.

8. The portable electronic device case of claim 6, wherein the flexible member is composed of a flexible material and is configured to flex relative to the mounting member.

9. The portable electronic device case of claim 1, wherein the charger includes an electrical connector affixed to an end of an extendable electrical cable, the electrical connector configured to plug into a charging port.

10. The portable electronic device case of claim 9, wherein the charger is stowable and extendable from an aperture disposed on the lower end of the first panel via the extendable cable.

11. The portable electronic device case of claim 1, wherein the battery includes a power switch for powering the battery on and off.

12. The portable electronic device case of claim 1, further including a locking mechanism disposed on the first and second panels for fastening the first and second panels to one another.

13. The portable electronic device case of claim 12, wherein the locking mechanism includes a latch positioned on a side perimeter edge of the second panel and an aperture positioned on a side perimeter edge of the first panel, wherein the latch is configured to engage the aperture.

14. The portable electronic device case of claim 13, wherein the latch is positioned on a center of the side perimeter edge of the second panel and the aperture is positioned on a center of the side perimeter edge of the first panel and are aligned with one another.

15. The portable electronic device case of claim 1, wherein the second panel is hingedly connected to the first panel via a metal hinge.

16. The portable electronic device of claim 1, wherein the second panel is hingedly connected to the second panel via a living hinge.

17. The portable electronic device case of claim 1, wherein the first panel and the second panel are the same size and shape, such that when fastened to one another they are aligned and coterminous.

\* \* \* \* \*